United States Patent
Cook et al.

(10) Patent No.: US 12,544,907 B2
(45) Date of Patent: *Feb. 10, 2026

(54) ROBOTIC CELLS

(71) Applicant: BAE Systems plc, London (GB)

(72) Inventors: Austin James Cook, Balderstone (GB); Daniel James Middleton, Balderstone (GB); Martin Knott, Balderstone (GB); Eric William Veitch, Balderstone (GB); Simon Cheetham, Preston (GB); Craig Philip Turnbull, Hawarden Wales (GB)

(73) Assignee: BAE Systems plc, London (GB)

( * ) Notice: Subject to any disclaimer, the term of this patent is extended or adjusted under 35 U.S.C. 154(b) by 252 days.

This patent is subject to a terminal disclaimer.

(21) Appl. No.: 18/553,943

(22) PCT Filed: Apr. 13, 2022

(86) PCT No.: PCT/GB2022/050941
§ 371 (c)(1),
(2) Date: Oct. 4, 2023

(87) PCT Pub. No.: WO2022/219344
PCT Pub. Date: Oct. 20, 2022

(65) Prior Publication Data
US 2024/0198512 A1 Jun. 20, 2024

(30) Foreign Application Priority Data

Apr. 14, 2021 (EP) ..................................... 21275043
Apr. 14, 2021 (GB) ..................................... 2105346

(51) Int. Cl.
*B25J 9/00* (2006.01)
*B25J 9/16* (2006.01)
(Continued)

(52) U.S. Cl.
CPC ............ *B25J 9/0084* (2013.01); *B25J 9/1697* (2013.01); *B25J 19/02* (2013.01); *B25J 19/06* (2013.01)

(58) Field of Classification Search
CPC ........ B25J 9/0084; B25J 9/1697; B25J 19/02; B25J 21/00; B25J 19/06; G05B 19/4188
See application file for complete search history.

(56) References Cited

U.S. PATENT DOCUMENTS 9,579,787 B2 * 2/2017 Zimmermann ........ B25J 9/1628
10,789,824 B1 9/2020 Cheng
(Continued)

FOREIGN PATENT DOCUMENTS

EP 3705239 A1 9/2020
JP 2009279748 A 12/2009
(Continued)

OTHER PUBLICATIONS

Manivannan, Robotic collision avoidance in a flexible assembly cell using a dynamic knowledge base, 1993, IEEE, p. 766-782 (Year: 1993).*

(Continued)

*Primary Examiner* — McDieunel Marc
(74) *Attorney, Agent, or Firm* — Maine Cernota & Curran (57) ABSTRACT

A robot cell, having a cell floor defining an array of nodes corresponding with a predetermined two-dimensional coordinate system and defining a volume for receiving a workpiece W therein, is described. The robot cell comprises: a set of robots, including a first robot, having respective bases, end effectors and working envelopes and defining respective three-dimensional coordinate systems, located according to the array of nodes; a set of detectors, including a first detector, configured to detect respective locations and/or bearings of the set of robots using a set of targets disposed (Continued)

on and/or in the cell floor; and a controller, communicatively coupled to the set of robots and to the set of detectors, configured to control movement of the set of robots using the detected respective locations and/or bearings of the set of robots.

15 Claims, 2 Drawing Sheets

(51) Int. Cl.
  *B25J 19/02* (2006.01)
  *B25J 19/06* (2006.01)

(56) References Cited

U.S. PATENT DOCUMENTS

| | | |
|---|---|---|
| 2004/0251866 A1 | 12/2004 | Gan |
| 2005/0286247 A1 | 12/2005 | Peterson |
| 2008/0114492 A1* | 5/2008 | Miegel .................. B25J 9/1664 901/6 |
| 2009/0326711 A1 | 12/2009 | Chang |
| 2015/0190926 A1* | 7/2015 | Miegel .................. B25J 9/1682 700/248 |
| 2015/0375390 A1 | 12/2015 | Becroft |
| 2016/0176054 A1* | 6/2016 | Foerster ................ B25J 19/021 700/254 |
| 2017/0038018 A1 | 2/2017 | Johnson |
| 2017/0361461 A1 | 12/2017 | Tan |
| 2018/0047178 A1 | 2/2018 | Kay |
| 2019/0105779 A1 | 4/2019 | Einav |
| 2019/0366545 A1 | 12/2019 | Mefford |
| 2020/0310387 A1 | 10/2020 | Cai |
| 2020/0398428 A1 | 12/2020 | Murray |
| 2021/0069825 A1 | 3/2021 | Aske |
| 2021/0096580 A1 | 4/2021 | Li |
| 2021/0339396 A1 | 11/2021 | Denenberg |
| 2022/0193900 A1 | 6/2022 | Berard |
| 2022/0197265 A1 | 6/2022 | Jensen |
| 2022/0227012 A1* | 7/2022 | Price ......................... G06T 7/80 |
| 2022/0234213 A1 | 7/2022 | Hock |
| 2022/0371825 A1 | 11/2022 | Gravelle |
| 2024/0416517 A1* | 12/2024 | Middleton ............. B25J 9/0084 |

FOREIGN PATENT DOCUMENTS

| | | |
|---|---|---|
| JP | 2014176924 A | 9/2014 |
| JP | 2016532570 A | 10/2016 |
| JP | 2017520419 A | 7/2017 |
| WO | 2020231319 A1 | 11/2020 |

OTHER PUBLICATIONS

Kak et al., A Knowledge-Based Robotic Assembly Cell, 1996, IEEE, p. 63-83 (Year: 1986).*
Hashem et al., Automating High-Precision X-Ray and Neutron Imaging Applications With Robotics, 2017, IEEE, p. 663-674 (Year: 2017).*
Morsy et al., A robot nuclear application, 2000, IEEE, p. 1-8 (Year: 2000).*
Fatikow et al., CameraMan: A multirobot system for nanohandling in a scanning electron microscope, 2008, IEEE, p. 437-442 (Year: 2008).*
Thormann et al., Localization of Workpieces by Robot Manipulators Using RFID Technology, 2019, IEEE, p. 52-57 (Year: 2019).*
Jenett et al., Material-Robot System for Assembly of Discrete Cellular Structures, 2019, IEEE, p. 4019-4026 (Year: 2019).*
Nguyen et al., A clickable world: Behavior selection through pointing and context for mobile manipulation, 2008, IEEE, p. 787-793 (Year: 2008).*
Office Action for U.S. Appl. No. 18/553,961 mail date May 15, 2025, 20 pages.
Office Action for U.S. Appl. No. 18/553,949 mail date Jun. 5, 2025, 55 pages.
Wang J. et al: "Cellular Robotic Systems: Self-organizing Robots and Kinetic Pattern Generation", 1988, IEEE, IEEE International Workshop on Intelligent Robots, pp. 139-144 (Year: 1988).
EP Search Report for Application No. 21275043.4 mail date Sep. 17, 2021, 9 pages.
Mei Biao et al: "Robot base frame calibration with a 2D vision system for mobile robotic drilling", The International Journal of Advanced Manufacturing Technology, Springer, London vol. 80, No. 9, May 1, 2015 (May 1, 2015, pp. 1903-1917, XP035536590, ISSN: 0268-3768, DOI: 10.1007/X00170-015-7031-4 [retrieved on May 1, 2015.
Clevy C et al: "Flexible Micro-Assembly System Equipped With an Automatic Tool Changer", Journal of Micro-Nano Mechatronics, Springer, DE, vol. 4, No. 1-2, Nov. 1, 2008 (Nov. 1, 2008), pp. 59-72, XP002575383, ISSN 1865-3928, DOI: 10.1007/S12213-008-0012-Z [retrieved on Jul. 22, 2008].
GB Search Report for Application No. GB2105346.7 mail date Jan. 14, 2022, 3 pages.
International Search Report and Written Opinion for International Application No. PCT/GB2022/050941 mail date Jul. 8, 2022, 16 pages.
EP Search Report for Application No. 21275042.6 mail date Sep. 20, 2021, 9 pages.
GB Search Report for Application No. GB2105345.9 mail date Jan. 25, 2022, 3 pages.
International Search Report and Written Opinion for International Application No. PCT/GB2022/050942 mail date Jul. 8, 2022, 16 pages.
EP Search Report for Application No. 21275041.8 mail date Sep. 20, 2021, 9 pages.
GB Search Report for Application No. GB2105343.4 mail date Jan. 25, 2022, 3 pages.
International Search Report and Written Opinion for Application No. PCT/GB2022/050943 mail date Jul. 8, 2022, 17 pages.
Final Office Action for U.S. Appl. No. 18/553,961 mail date Oct. 28, 2025, 23 pages.

* cited by examiner

ROBOTIC CELLS

RELATED APPLICATIONS

This application is a national phase application filed under 35 USC § 371 of PCT Application No. PCT/GB2022/050941 with an International filing date of Apr. 13, 2022, which claims priority of GB Patent Application 2105346.7 filed Apr. 14, 2021 and EP patent application Ser. No. 21/275,043.4 filed Apr. 14, 2021. All three of these applications are incorporated herein by reference in their entirety for all purposes.

FIELD OF THE INVENTION

The present invention relates to robot cells and methods of controlling robot cells.

BACKGROUND

Manufacturing, including assembly, of relatively large and/or complex workpieces, particularly high-value workpieces such as aircraft or parts thereof, may be performed, at least in part, using one or more industrial robots, such as multi-axis robots, in robot cells. For example, a plurality of robots may be employed to simultaneously assemble a particular aerostructure, within a single robot cell, assembly of which is typically performed over eight to twelve weeks. Such simultaneous assembly requires coordinated control of the individual robots.

Hence, there is a need to improve robot cells and methods of controlling robot cells.

SUMMARY OF THE INVENTION

It is one aim of the present invention, amongst others, to provide a robot cell and a method of controlling a robot cell which at least partially obviates or mitigates at least some of the disadvantages of the prior art, whether identified herein or elsewhere. For instance, it is an aim of embodiments of the invention to provide a robot cell that improves reconfiguration thereof. For instance, it is an aim of embodiments of the invention to provide a robot cell that improves positioning and/or assembly of a workpiece, or part thereof, received therein. For instance, it is an aim of embodiments of the invention to provide a method of controlling a robot cell that improves configuration thereof. For instance, it is an aim of embodiments of the invention to provide a method of controlling a robot cell that uses a coordinate system defined by a workpiece, or part thereof, received therein.

A first aspect provides a robot cell, having a cell floor defining an array of nodes corresponding with a predetermined two-dimensional coordinate system and defining a volume for receiving a workpiece therein, wherein the robot cell comprises:
- a set of robots, including a first robot, having respective bases, end effectors and working envelopes and defining respective three-dimensional coordinate systems, located according to the array of nodes;
- a set of detectors, including a first detector, configured to detect respective locations and/or bearings of the set of robots optionally using a set of targets disposed on and/or in the cell floor; and
- a controller, communicatively coupled to the set of robots and to the set of detectors, configured to control movement of the set of robots using the detected respective locations and/or bearings of the set of robots.

A second aspect provides a method of controlling a robot cell, having a cell floor defining an array of nodes corresponding with a predetermined two-dimensional coordinate system and defining a volume for receiving a workpiece therein, wherein the method comprises:
- detecting, by a set of detectors, including a first detector, and optionally a set of targets disposed on and/or in the cell floor, respective locations and/or bearings of a set of robots, including a first robot, having respective bases, end effectors and working envelopes and defining respective three-dimensional coordinate systems, located according to the array of nodes; and
- controlling, by a controller communicatively coupled to the set of robots and to the set of detectors, movement of the set of robots using the detected respective locations and/or bearings.

A third aspect provides a computer comprising a processor and a memory configured to implement, at least in part, a method according to the second aspect.

A fourth aspect provides a computer program comprising instructions which, when executed by a computer comprising a processor and a memory, cause the computer to perform, at least in part, a method according to the second aspect.

A fifth aspect provides a non-transient computer-readable storage medium comprising instructions which, when executed by a computer comprising a processor and a memory, cause the computer to perform, at least in part, a method according to the second aspect.

A sixth aspect provides a robot cell for a set of robots including a first robot, the robot cell having a cell floor defining an array of nodes corresponding with a predetermined two-dimensional coordinate system and defining a volume for receiving a workpiece therein, wherein the set of robots, having respective bases, end effectors and working envelopes and defining respective three-dimensional coordinate systems, is located according to the array of nodes;
wherein the robot cell comprises:
- a set of detectors, including a first detector, configured to detect respective locations and/or bearings of the set of robots; and
- a controller, communicatively coupled to the set of robots and to the set of detectors, configured to control movement of the set of robots using the detected respective locations and/or bearings of the set of robots.

The respective bases of the set of robots may be releasably attached to the cell floor.

The cell floor may comprise a set of electrical and/or communications outlets, including a first electrical and/or communications outlet, and wherein the set of robots is releasably coupled thereto.

The respective nodes of the array thereof may be mutually equispaced on the predetermined two-dimensional coordinate system.

A ratio of the number of robots included in the set thereof to the number of nodes in the array thereof may be at least 1:10.

The first detector may be provided on and/or integrated with the first robot.

The first detector may comprise and/or may be a non-contact detector. The first detector may be a non-contact detector configured to detect the location and/or bearing of the first robot using the set of targets disposed on and/or in a corresponding node in the cell floor. The first detector may comprise and/or may be a camera, a RFID tag reader, a barcode reader, a fiducial marker reader and/or a proximity sensor.

The robot cell may comprise a set of sensors, including a first sensor, configured to sense respective poses of the set of robots.

The controller may be configured to obtain a master three-dimensional coordinate system and to control the movement of the set of robots according to the obtained master three-dimensional coordinate system. The obtained master three-dimensional coordinate system may be defined, at least in part, by a workpiece received in the defined volume.

The controller may be configured to correlate respective three-dimensional coordinate systems of the set of robots, the predetermined two-dimensional coordinate system and a three-dimensional coordinate system of the workpiece to the obtained master three-dimensional coordinate system.

The robot cell may comprise a safety system, wherein the controller is communicatively coupled to the safety system and configured to arrange the safety system using the detected respective locations and/or bearings. The safety system may be configured to indicate a path for a human operator on the cell floor using a set of visual alerts.

The set of robots may include a second robot, wherein the respective working envelopes of the first robot and the second robot may intersect and wherein the controller may be configured to control movement of the first robot and the second robot in mutual coordination using the detected respective locations and/or bearings of the set of robots.

DETAILED DESCRIPTION

According to the present invention there is provided a robot cell, as set forth in the appended claims. Also provided is a method of controlling a robot cell. Other features of the invention will be apparent from the dependent claims, and the description that follows.

Robot Cell

The first aspect provides a robot cell, having a cell floor defining an array of nodes corresponding with a predetermined two-dimensional coordinate system and defining a volume for receiving a workpiece therein, wherein the robot cell comprises:
 a set of robots, including a first robot, having respective bases, end effectors and working envelopes and defining respective three-dimensional coordinate systems, located according to the array of nodes;
 a set of detectors, including a first detector, configured to detect respective locations and/or bearings of the set of robots; and
 a controller, communicatively coupled to the set of robots and to the set of detectors, configured to control movement of the set of robots using the detected respective locations and/or bearings of the set of robots.

In this way, the respective locations and/or bearings of the set of robots, located according to the array of nodes in the robot cell, are detected, for example in real-time, and the movement of the set of robots is controlled using the detected respective locations and/or bearings. In this way, reconfiguration of the robot cell is improved since mutual interdependencies of the set of robots are accounted for by the controller.

In this way, during manufacturing of a workpiece, the robot cell may be reconfigured and the reconfiguration accounted for by the controller. For example, the robot cell may be reconfigured to relocate a particular robot therein, in order to perform a subsequent stage of the manufacturing previously outside of the respective working envelope of the particular robot. Additionally and/or alternatively, the robot cell may be reconfigured by removing an existing robot from the robot cell and/or introducing a new robot into the robot cell, for example so as to perform a specific stage of the manufacturing. For example, during manufacturing, dimensions of the workpiece may change. Hence, the robot cell may be dynamic, transitioning over time due to successive reconfigurations. However, each reconfiguration, such as relocating, removing and/or introducing a robot and/or changing dimensions of the workpiece, consequently affects control of the robots. For example, relocation of a particular robot may limit the permissible working envelopes of one or more adjacent robots, which in turn may limit the working envelope of the relocated robot. That is, the individual robots may not be independent but instead, mutually interdependent. However, since the mutual interdependencies of the set of robots are accounted for by the controller, reconfiguration of the robot cell is improved.

Particularly, reconfiguration of the robot cell is improved because the respective locations and/or bearings of the set of robots are detected, communicated to the controller and used by the controller upon controlling movement thereof. For example, the robot cell may be reconfigured to relocate (i.e. change of location and/or bearing) a particular robot of the set thereof therein, in order to perform a subsequent stage of the manufacturing previously outside of the respective working envelope of the particular robot. For example, the controller is not bound by the respective working envelopes of the robots of the set thereof and hence is independent of such corresponding working limits i.e. agnostic of robot position. Hence, the controller may instruct relocation of the particular robot. Such relocation of the particular robot may limit the permissible working envelopes of one or more adjacent robots of the set thereof, which in turn may limit the working envelope of the relocated robot. The permissible working envelopes may be defined by Cartesian limit zones and/or may be related to any object, for example workpiece or part thereof, robot, peripheral or human operator. Hence, the controller may programmatically define boundaries for each robot, for example dynamically. In such an example, the new location and bearing of the relocated robot is detected by the set of detectors and the controller controls movement of the set of robots, including the relocated particular robot, using the detected location and/or bearing of the relocated robot and the respective detected locations and/or bearings of the other robots of the set thereof. For example, the robot cell may be reconfigured by removing an existing robot of the set thereof from the robot cell. In such an example, absence of the removed robot is detected by the set of detectors and the controller controls movement of the remaining robots of the set thereof, using the respective detected locations and/or bearings of the remaining robots of the set thereof. Additionally and/or alternatively, absence of a robot capable of performing a desired task may be identified by the controller and/or the controller may select which particular robot will perform the desired task. For example, the robot cell may be reconfigured by introducing a new robot into the robot cell, for example so as to perform a specific stage of the manufacturing. In such an example, the location and bearing of the new robot is detected by the set of detectors and the controller controls movement of the set of robots, including the new robot, using the detected location and/or bearing of the relocated robot and the respective detected locations and/or bearings of the other robots of the set thereof. Additionally and/or alternatively, the working envelopes and/or capabilities (for example, according to respective end effectors) may be maximised and/or optimised. For example, end effectors may be interchangeable between different robots, thereby enabling a task to be performed by a suitably located robot. For example, the end effectors may be communicatively, for example bidirectionally, couplable to the robots and may thus communicate respective capabilities to the robots and/or the controller i.e. smart end effectors. In this way, the end effectors may be flexibly and/or generically implemented and/or distributed control thereof provided by the controller, facilitating programming of the robot cell. Hence, reconfiguration of the robot cell, such as relocating, removing and/or introducing a robot, is accounted for by the controller, thereby also reducing downtime due to the reconfiguration. Additionally and/or alternatively, safe paths through the robot cell for human operators may also be updated accordingly, for example by the controller, as described below in more detail.

Robot Cell

The first aspect provides the robot cell. Robot cells are known. Generally, a robot cell (also known as a robotic cell, robotized cell or workcell) includes one or more robots, individual robot controllers, and optionally peripherals such as benches, machine tools and/or part positioners and/or a safety system.

Cell Floor

The robot cell has the cell floor defining the array of nodes corresponding with the predetermined two-dimensional coordinate system. It should be understood that the cell floor comprises and/or is a substrate, such as a platform or working area, upon which the set of robots is located and upon and/or of which the workpiece is received. For example, the cell floor may be a suspended cell floor (e.g. suspended at a distance above a factory floor or the ground). The suspended cell floor may comprise floor tiles/floor modules with accompanying supporting structures which function to provide structural support to the suspended cell floor. Advantageously providing such a cell floor means that the robot cell can be utilised on an uneven factory floor or uneven ground (with, for example, shims utilised to take account of such unevenness) and can provide space underneath the cell floor for the running and housing of wiring, for example electrical wiring and communication wiring.

Generally, the cell floor is planar (i.e. horizontally) and hence the predetermined two-dimensional coordinate system, for example (x, y), may be defined thereupon and optionally, in turn, a predetermined three-dimensional coordinate system, for example (x, y, z), may be defined therefrom, in which the cell floor is at z=0. Alternatively, the origin in the z dimension may be defined according to a pedestal upon which a robot is mounted. Other coordinate systems may be defined. It should be understood that the array of nodes comprises and/or is a physical and/or structural array, rather than merely a logical or conceptual array. Particularly, the set of robots is located according to the array of nodes, as described below in more detail. Hence, it should be understood that the array of nodes defines the respective locations and/or bearings of the set of robots. In other words, the array of nodes defines where the robots of the set thereof (and optionally, peripherals of the set thereof) are respectively locatable and/or their respective bearings. It should be understood that the respective nodes of the array thereof are similar, thereby enabling a particular robot of the set thereof to be relocated according to any node, for example. In one example, a first node of the array thereof comprises and/or is an attachment point for a robot. In one example, a first node of the array thereof comprises and/or is a cell floor module, optionally comprising an attachment point for a robot, wherein the cell floor is provided by a corresponding array of cell floor modules. In this way, the cell floor is modular and hence scalable, for example by adding, removing and/or moving cell floor modules. Each node of the array thereof may be as described with respect to the first node.

In one example, respective nodes of the array thereof are regularly arranged on the predetermined two-dimensional coordinate system, for example in a polygonal array, such as a triangular array, a square array, a rectangular array, an hexagonal array, or a circular array. In this way, the set of robots may be located according to a regular array. In one example, respective nodes of the array thereof tesselate on the predetermined two-dimensional coordinate system. In this way, scalability of the cell floor is facilitated, since the respective nodes are geometrically similar. In one example, respective nodes of the array thereof are mutually equispaced on the predetermined two-dimensional coordinate system. In this way, a complexity of the array of nodes is relatively reduced.

In one example, the array of nodes includes N nodes, wherein N is a natural number greater than or equal to 1, for example 1, 2, 3, 4, 5, 6, 7, 8, 9, 10, 20, 50, 100, 200, 500 or more. In one example, N is a composite number (i.e. not a prime number). In one example, N is a square number. Preferably, the array of nodes comprises and/or is at least 2 nodes, for example 2 to 4, 2 to 8, 2 to 10, 2 to 20, 2 to 50, 2 to 100, 2 to 200 or 2 to 500 nodes.

In one example, the cell floor comprises a set of electrical and/or communications outlets, including a first electrical and/or communications outlet (for example, in the form of a ring circuit or radial circuit in, on or under the cell floor), for releasable coupling to the set of robots, for example wherein the set of electrical and/or communications outlets corresponds with the array of nodes. In this way, electrical and/or communications services are provided for the set of robots, for example at each node. In one example, in use, the set of robots is releasably coupled set of electrical and/or communications outlets.

The three-dimensional coordinate system of the workpiece, the three-dimensional coordinate system of the robot(s) and optionally the three-dimensional coordinate system of the peripheral(s) can be aligned to the predetermined two-dimensional coordinate system of the cell floor and the master three-dimensional coordinate system. This advantageously allows the present invention to utilise the predetermined two-dimensional coordinate system of the cell floor and the master three-dimensional coordinate system to extend the working volume of the set of robots. This is particularly advantageous for the production and assembly of larger workpieces and end products.

Volume

The robot cell defines the volume for receiving the workpiece therein. It should be understood that the volume is that region above the cell floor and includes the set of robots in addition to the workpiece received therein, and optionally further includes one or more peripherals. A predetermined three-dimensional coordinate system may be assigned to the volume, as described previously.

Workpiece

The robot cell defines the volume for receiving the workpiece therein. In one example, the workpiece comprises and/or is an aircraft or part of, such as an aerostructure. The workpiece may define its own respective three-dimensional coordinate system.

Robots

The robot cell comprises the set of robots, including the first robot, having respective bases, end effectors and working envelopes and defining respective three-dimensional coordinate systems, located according to the array of nodes. In other words, the set of robots includes one or more robots. That is, generally as described herein, sets exclude empty sets. It should be understood that respective robots of the set thereof are industrial robots, such as articulated or multiaxis robots, Cartesian coordinate robots, cylindrical coordinate robots, spherical coordinate robots, SCARA robots and/or delta robots. It should be understood that respective robots of the set thereof may be mutually similar or mutually different. That is, similar robots may be included in the set thereof (i.e. a homogeneous set) or different robots may be included in the set thereof (i.e. a heterogeneous set). Suitable robots may be obtained from ABB, The Yaskawa Electric Corporation, Midea Group (KUKA), The Fanuc Corporation, Kawasaki Heavy Industries, Epson Robots, Stäubli, Nachi Fujikoshi Corporation, Comau and/or Omron Adept Technology Inc., for example. Other manufacturers are known. In one example, the first robot comprises and/or is an articulated or multiaxis robot. It should be understood that the respective robots of the set thereof each have: a base, for attachment to the cell floor, optionally on a pedestal to increase the working envelope in the z dimension, and/or connection to electrical and/or communications outlets; an end effector for performing a task; and a working envelope, as understood by the skilled person. It should be understood that the respective robots of the set thereof each define a respective three-dimensional coordinate system i.e. individually, for example based on an individual datum or reference, as understood by the skilled person. It should be understood that the set of robots is located according to the array of nodes and hence, each robot of the set thereof is located according to the array of nodes.

In one example, a ratio of the number of robots included in the set thereof to the number of nodes in the array thereof is at least 1:2 or 1:4, more preferably 1:10, at least 1:25, or at least 1:50. In this way, the array of nodes provides many locations where the respective robots of the set thereof are locatable, thereby enabling improved flexibility for manufacturing.

In one example, respective bases of the set of robots are releasably attached to the cell floor. In this way, the robot cell may be reconfigured, for example repeatedly. In one example, respective bases of the set of robots comprise a part, for example a male part, of a releasable attachment and the cell floor, for example respective nodes and/or cell floor modules, comprises corresponding parts, for example corresponding female parts, of the releasable attachment. In one example, the releasable attachment comprises and/or is a mechanical releasable attachment, for example provided by mechanical fasteners such as bolts and threaded passageways, zero point clamps, cup and cones, and/or quick release fasteners such as cam fasteners, and/or an electromagnetic releasable attachment. For example, the robot cell may be reconfigured to relocate (i.e. change of location and/or bearing) a particular robot of the set thereof, requiring detachment of the particular robot from the cell floor, relocation of the detached robot using an overhead crane and reattachment of the particular robot to the cell floor at the new location and/or bearing. Such reconfigurations may be undertaken relatively frequently, for example every few days (for example every 2 to 10 days), and to maximise efficiency in the robot cell, should be undertaken with minimum disruption.

In one example, the set of robots includes R robots, wherein R is a natural number greater than or equal to 1, for example 1, 2, 3, 4, 5, 6, 7, 8, 9, 10 or more, for example 1 to 100, 1 to 50, 1 to 20, 1 to 10 or 1 to 5 robots. That is, the robot cell may be a multi-robot cell comprising a plurality of robots (i.e. R is at least 2), for example 2 to 100, 2 to 50, 2 to 20, 2 to 10 or 2 to 5 robots. It should be understood that the number of robots in the robot cell may be increased and decreased i.e. flexed as required, for example depending upon tasks to be performed.

In one example, the set of robots includes a second robot, wherein the respective working envelopes of the first robot and the second robot intersect and wherein the controller is configured to control movement of the first robot and the second robot in mutual coordination using the detected respective locations and/or bearings of the set of robots. In this way, coordinated control of the first robot and the second robot is provided by the controller.

It should be understood that the set of robots is located according to the array of nodes. Hence, respective robots of the set thereof are located according to the array of nodes, as described previously. However, it should be understood that an accuracy and/or precision of location of the set of robots may be relatively low, compared with an accuracy and/or precision (also known as repeatability) of the respective robots (i.e. of the respective end effectors) of the set thereof. For example, the accuracy and/or the repeatability of a particular robot maybe within 0.1 mm. In contrast, the accuracy and/or the precision of location of the particular robot according to the array of nodes may be within 10 mm, preferably within 2 mm, for example as determined by releasable attachments used to attach the respective bases of the set of robots to the cell floor and/or as determined by tolerance buildup errors in the cell floor, for example upon assembly of cell floor modules. That is, the accuracy and/or the precision of location of the particular robot maybe 1 to 2 orders of magnitude lower than that of the particular robot. In other words, locating the set of robots according to the array of nodes provides a relatively coarse location, which while not typically suitable for manufacturing to tight accuracy and/or precision, nevertheless facilitates locating the set of robots during initial configuration and/or reconfiguration of the robot cell. Particularly, even such relatively lower accuracy and/or precision of the respective locations of the set of robots enables the controller to control movement of the set of robots using the detected respective locations and/or bearings of the set of robots, for example in mutual coordination. Accordingly, the robot cell and method of the present invention provides for a method of initial configuration and/or reconfiguration of a robot cell, which allows for the determination of position and/or bearing (orientation) of the robot(s) and peripheral(s), relative to the cell floor coordinate system and the master three-dimensional coordinate system. Advantageously this allows the immediate, safe use of the robot(s) after configuration or reconfiguration of the robot cell. It also advantageously provides the ability to configure or reconfigure a robot cell that encompasses a volume larger than a single robot working envelope or multiple robots' working envelopes (in other words, the cell floor co-ordinate system has a larger reach than that of a single robot working envelope or multiple robots' working envelopes). This further advantageously means that there is no upper limit to the working volume of the robot to the workpiece. The robot cell and method of the present invention may further provide additional calibration, recalibration and/or refining of the location, orientation and/or poses of a particular robot, peripheral or workpiece by the use of the sensors, as described further below. In other words, the accuracy and/or the precision of location and/or orientation may be further calibrated, recalibrated and/or refined.

Detectors

The robot cell comprises the set of detectors, including the first detector, configured to detect respective locations and/or bearings of the set of robots.

Preferably the first detector is configured to detect the location and/or bearing of the first robot, and optionally the further detectors of the set of detectors are each configured to detect the location and/or bearing of their respective robot of the set of robots.

Preferably each robot or peripheral comprises at least two detectors.

It should be understood that the respective locations are the physical locations of the robots of the set thereof, for example according to the predetermined two-dimensional coordinate system. It should be understood that the respective bearings are the directions of the robots of the set thereof, for example north, south, east or west or according to a predetermined angular coordinate system, for example for each node. That is, at any particular location, a particular robot may face one of multiple directions i.e. have a particular bearing. It should be understood that the working envelope of the particular robot may be thus determined, in the volume, by both the location and the bearing thereof. For example, the robot cell may be reconfigured to change a location only of a particular robot, to change a bearing only of a particular robot or to change both the location and the bearing of a particular robot. In contrast, it should be understood that a pose of a robot, for example an end effector thereof, maybe described in terms of position and/or orientation.

In one example, the first detector comprises and/or is a non-contact detector. That is, mutual contact of the first detector and the set of robots is not required. In this way, a likelihood of accidental damage thereto may be reduced.

In one example, the first detector comprises and/or is a camera, a RFID tag reader, a barcode reader for example a safety rated QR reader, a fiducial marker reader and/or a proximity sensor. In this way, the first detector may detect the respective locations and/or bearings of the set of robots, using one or more images thereof, by reading respective RFID tags thereof, by reading respective barcodes thereof, by reading respective fiducial markers thereof and/or by sensing proximity thereof, respectively. Suitable cameras, RFID tag readers, barcode readers, fiducial marker readers and/or proximity sensors are known. Preferably the detector is a Safety Integrity Level (SIL) rated detector.

In one example, respective detectors of the set thereof are provided on and/or integrated with the respective robots of the set thereof, for example on and/or in their respective bases. In this way, the respective robots may effectively detect their own respective locations and/or bearings, for example autonomously, and communicate these to the controller.

In one example, the set of detectors is configured to detect the respective locations and/or bearings of the set of robots using a set of targets, including a first target. It should be understood that the targets are predetermined. In this way, detect the respective locations and/or bearings of the set of robots is facilitated since the respective locations and/or bearings of the set of robots are detected using the set of targets c.f. using the set of robots.

In one example, the first target comprises and/or is a RFID tag, a barcode and/or a fiducial marker. Such targets are relatively simple, robust and low-cost and may include metadata, such as location and/or bearing information.

In one example, the set of targets is disposed on and/or in the cell floor. In this way, the set of targets may correspond with the array of nodes.

Preferably the detector(s) are mounted on and/or in the base of a robot with their field of view or field of detection facing towards the target disposed in and/or on a node of the cell floor.

In one example, a plurality of detectors of the set thereof, for example 2, is provided on and/or integrated with the respective robots of the set thereof, for example on and/or in their respective bases, wherein each of the detectors of the plurality thereof is a noncontact detector configured to detect respective locations and/or bearings of the set of robots using a set of targets, for example corresponding targets, disposed on and/or in the cell floor. In this way, the respective locations and/or bearings of the set of robots are each detected using a plurality of detectors and targets, thereby providing confirmation and/or redundancy, for example in event of accidental damage to detectors and/or targets.

In one example, the set of detectors, including the first detector, is configured to detect respective locations and/or bearings of the set of robots repeatedly, for example intermittently, periodically or continuously. In this way, reconfiguration of the robot cell is provided to the controller. For example, the respective locations and/or bearings of the set of robots may be determined hourly, before and/or after performing a task, upon relocation and/or on demand. In one example, the controller is configured to instruct relocation of the first robot.

In one example, the set of detectors is configured to detect respective re-locations and/or re-bearings of the set of robots. In this way, the set of detectors may detect relocation and/or re-bearing of the set of robots.

In one example, each node of the array thereof is mapped to a corresponding target (or plurality of targets) of the set of targets, for example barcodes such as QR codes, disposed on and/or in the cell floor. For example, each node may be mapped to one or more unique QR codes. For example, for a square array of nodes, each robot of the set thereof may comprise a safety rated QR code reader at each corner of a base thereof, such that each robot detects four QR codes. By comparing the detected QR codes with the mapping between the array of nodes and the set of targets, the respective locations and/or bearings of the robots may be determined, for example by the respective robot and/or the controller. It should be understood that by detecting four QR codes, redundancy is provided, thereby safeguarding against false readings. In other words, up to two detectors can fail from the four detectors provided on and/or integrated with a respective robot whilst still providing the location and orientation of said robot.

Sensors

In one example, the robot cell comprises a set of sensors, including a first sensor, configured to sense respective poses of the set of robots. It should be understood that the set of sensors provides external sensing, such as using a vision system or infrared sensors. External sensing is known. In this way, accuracy and/or precision of control of the set of robots may be improved, using the sensed respective poses of the set of robots.

In one example, the first sensor comprises and/or is a non-contact sensor, for example a remote sensor. In one example, the first sensor comprises and/or is a camera, for example a visible or IR camera, and/or a laser, for example a laser tracker. In one example, the first sensor comprises and/or is a vision system. Suitable sensors and vision systems are known.

In one example, the first sensor comprises and/or is a moveable and/or moving sensor. In this way, the first sensor may be moved around and/or within the robot cell and thus sense a particular robot during movement thereof and/or sense a plurality of robots of the set thereof. In one example, the robot cell comprises a gantry, for example a (x, y) gantry or a (x, y, z) gantry and the first sensor and/or the set of sensors is mounted thereupon. In one example, the robot also comprises a turntable and the first sensor and/or the set of sensors is mounted thereupon. Advantageously this means that the sensor and/or the workpiece can be in motion within the robot cell, and do not need to be in a fixed position, thus providing a flexible and easily reconfigurable robot cell.

In one example, the set of sensors includes a second sensor and the first sensor and the second sensor are disposed mutually orthogonally. In this way, the first robot may be sensed by the first sensor and the second sensor in two mutually orthogonal directions, thereby improving an accuracy and/or precision of guiding thereof.

In one example, the set of sensors is configured to repeatedly, for example intermittently, periodically or continuously, sense the respective poses of the set of robots while the controller guides the set of robots. In this way, the controller may guide the set of robots in real-time, based on feedback from the set of sensors.

In one example, the controller is configured to guide the set of robots within the respective working envelopes by correcting respective movements thereof using the sensed respective poses. In this way, an accuracy and/or precision of guiding the set of robots by the controller may be improved. For example, a particular robot may be guided relative to a three-dimensional coordinate system, for example a pre-determined/pre-calculated or master three-dimensional coordinate system, the workpiece and/or part thereof for example a feature such as a hole therein and/or a peripheral.

In one example, the set of sensors is configured to selectively sense respective poses of the set of robots, depending on respective movement thereof. For example, the set of sensors may be configured to selectively sense a pose of the first robot while the first robot performs a relatively high accuracy and/or precision task on the workpiece, so as to improve an accuracy and/or precision of the task, and not sense a pose of the first robot while the first robot a relatively low accuracy and/or precision task such as exchanging a tool of the end effector. For example, the pose of the first robot may be calibrated and/or a calibration thereof updated based on the sensed pose thereof.

Controller

The robot cell comprises the controller, communicatively coupled to the set of robots and to the set of detectors, configured to control movement of the set of robots using the detected respective locations and/or bearings of the set of robots. It should be understood that the controller is thus a master controller (c.f. individual controllers included with the respective robots of the set thereof), having an overview of the robot cell including the detected respective locations and/or bearings of the set of robots (and optionally, of the workpiece(s), peripheral(s) and perimeter/boundaries of the cell floor) and operations performed by the respective robots. Typically, the controller is implemented in software and/or hardware, for example using a computer having a processor and a memory including instructions which when executed, control movement of the set of robots using the detected respective locations and/or bearings of the set of robots. It should be understood that the controller is communicatively coupled to the set of robots, for example bidirectionally, and may thus receive information from the respective robots of the set thereof, including respective working envelopes and end effectors, and transmit information to the respective robots of the set thereof, so as to control, for example coordinate, movement thereof using the detected respective locations and/or bearings. In this way, collisions between mutually adjacent robots may be avoided and/or manufacturing efficiency enhanced via cooperative movement (e.g. performing tasks together) of mutually adjacent robots. It should be understood that the controller is communicatively coupled to the set of detectors, for example unidirectional or bidirectionally, and may thus receive the detective respective locations and/or bearings of the set of robots therefrom, for example repeatedly.

In one example, the controller is configured to modify, for example limit, expand or restore, a working envelope and/or a motion parameter (for example feed rate or speed) of a robot of the set thereof, for example based on the detected respective locations and/or bearings of the set of robots and their respective working envelopes. In this way, potential collisions between mutually adjacent robots may be avoided and/or manufacturing efficiency enhanced via cooperative movement (e.g. performing tasks together) of mutually adjacent robots.

In one example, the controller is configured to initiate an action, in response to the detected respective locations and/or bearings of the set of robots. In one example, the action is selected from: identifying a robot of the set thereof having a correct or an incorrect location and/or bearing; identifying a correct location and/or bearing for a particular robot; implementing a reconfiguration request, a remedial action or a safety action such as pausing movement of a particular robot or the set of robots; modifying such as limiting, expanding or restoring a working envelope of a robot of the set thereof; updating a model of the robot cell; programming or reprogramming a robot of the set thereof; request relocation of a particular robot of the set thereof.

In one example, the controller is configured to obtain a three-dimensional coordinate system, for example a pre-determined/pre-calculated or master three-dimensional coordinate system. In this way, the robot cell, for example movement of the set of robots, may be controlled according to the obtained master three-dimensional coordinate system. In one example, the controller is configured to correlate, for example map, respective three-dimensional coordinate systems of the set of robots, and optionally the respective three-dimensional coordinate systems of the workpiece(s) and/or peripheral(s), to the obtained master three-dimensional coordinate system. In this way, a three-dimensional coordinate system of a particular robot, workpiece and/or peripheral may be overlaid on the master three-dimensional coordinate system and movement of the particular robot, workpiece and/or peripheral controlled according to the obtained master three-dimensional coordinate system, as correlated with the three-dimensional coordinate system of the particular robot, workpiece and/or peripheral. In this way, movement of the set of robots, workpiece and/or peripheral may be controlled according to a single master three-dimensional coordinate system, thereby improving accuracy and/or precision of coordinated control thereof. In one example, the obtained master three-dimensional coordinate system is defined, at least in part, by the received workpiece. In this way, movement of the set of robots may be controlled according to a single master three-dimensional coordinate system defined, at least in part, by the received workpiece around which the set of robots moves. In this way, this single master three-dimensional coordinate system is a characteristic of the workpiece and independent of the robot cell. Hence, the workpiece may be repositioned and/or reoriented within the robot cell and/or transferred between robot cells and such repositioning and/or reorientation and/or transfer iterated to the controller, thereby improving efficiency.

In one example, the controller is configured to guide the set of robots within the respective working envelopes according to the obtained master three-dimensional coordinate system using the sensed (i.e. externally sensed) respective poses of the set of robots. In this way, an accuracy and/or precision of the set of robots is improved since the controller guides the set of robots using the sensed respective poses of the set of robots and according to the obtained three-dimensional coordinate system, for example a single master three-dimensional coordinate system defined, at least in part, by the received workpiece around which the set of robots moves, as described previously.

Safety System

In one example, the robot cell comprises a safety system, configured to alert the human operator, wherein the controller is communicatively coupled to the safety system.

In one example, the controller is configured to arrange the safety system using the detected respective locations and/or bearings of the set of robots and the respective working envelopes of the set of robots. In this way, safe paths through the robot cell for human operators be defined, identified and/or updated, thereby improving cooperative working between the set of robots and the human operators by improving safety thereof.

In one example, the controller is configured to rearrange the safety system using detected respective re-locations and/or re-bearings and the respective working envelopes of the set of robots. In this way, the safety system may be updated accordingly.

In one example, the safety system comprises a set of audio and/or visual alerts, including a first audio and/or visual alert, and wherein the controller is configured to arrange the safety system by selectively enabling or disabling the first audio and/or visual alert. Audio alerts include sirens and/or spoken words, for example. Visual alerts include lighting and/or displayed images, for example. In this way, the safety system may be dynamically updated, for example in real-time, based upon movement of the set of robots and/or presence of human operators, thereby improving safety. In one example, the set of visual alerts is provided in and/or on the cell floor, thereby indicating a safe path thereacross and/or indicating a hazardous area. In one example, the safety system is configured to indicate a path for a human operator on the cell floor, for example using the set of visual alerts.

In one example, the safety system comprises a set of identifiers, including a first identifier, configured to identify a disposition of the human operator and wherein the controller is configured to arrange the safety system based on the identified disposition of the human operator. In this way, the safety system may be dynamically updated, for example in real-time, based the disposition of the human operator, thereby improving safety.

In one example, the controller is configured to control respective movements of the set of robots, for example by modifying a speed of movement or avoiding collision, based on the identified disposition of the human operator. In this way, co-operative working between the set of robots and the human operator is improved.

Peripherals

In one example, the robot cell comprises a set of peripherals, including a first peripheral (for example a bench, a machine tool or a part positioner), having respective bases, located according to the array of nodes;
wherein the set of detectors is configured to detect respective locations and/or bearings of the set of peripherals; and
wherein the controller is configured to control movement of the set of robots using the detected respective locations and/or bearings of the set of peripherals. A peripheral may define its own respective three-dimensional coordinate system.

In this way, respective locations and/or bearings of the set of peripherals may be accounted for by the controller when controlling movement of the set of robots. In this way, potential collisions between a robot and a mutually adjacent peripheral may be avoided and/or manufacturing efficiency enhanced. In this way, the set of robots may cooperate with the set of peripherals. For example, a particular robot may select a tool provided by a particular peripheral configure the respective end effector thereof with the selected tool. For example, a particular robot may request relocation of a particular peripheral, such that the particular is removed from the respective working envelope of the particular robot.

Accordingly the detectors may also be configured to detect the location and/or bearing of a peripheral using one or more targets, for example on or in the cell floor. In one example, respective detectors of the set thereof are provided on and/or integrated with one or more peripherals, for example on and/or in their respective bases. In this way, the respective peripherals may effectively detect their own respective locations and/or bearings, for example autonomously, and communicate these to the controller.

The sixth aspect provides a robot cell for a set of robots including a first robot, the robot cell having a cell floor defining an array of nodes corresponding with a predetermined two-dimensional coordinate system and defining a volume for receiving a workpiece therein, wherein the set of robots, having respective bases, end effectors and working envelopes and defining respective three-dimensional coordinate systems, is located according to the array of nodes;
wherein the robot cell comprises:
a set of detectors, including a first detector, configured to detect respective locations and/or bearings of the set of robots; and
a controller, communicatively coupled to the set of robots and to the set of detectors, configured to control movement of the set of robots using the detected respective locations and/or bearings of the set of robots.

The robot cell, the cell floor, the array of nodes, the predetermined two-dimensional coordinate system, the volume, the workpiece, the detecting, the set of detectors, the first detector, the respective locations and/or bearings, the set of robots, the first robot, the respective bases, end effectors and working envelopes, the respective three-dimensional coordinate systems, the controlling, the controller and/or the movement of the set of robots may be as described with respect to the first aspect.

Method of Controlling a Robot Cell

The second aspect provides a method of controlling a robot cell, having a cell floor defining an array of nodes corresponding with a predetermined two-dimensional coordinate system and defining a volume for receiving a workpiece therein, wherein the method comprises:
detecting, by a set of detectors including a first detector, respective locations and/or bearings of a set of robots, including a first robot, having respective bases, end effectors and working envelopes and defining respective three-dimensional coordinate systems, located according to the array of nodes; and controlling, by a controller communicatively coupled to the set of robots and to the set of detectors, movement of the set of robots using the detected respective locations and/or bearings.

The robot cell, the cell floor, the array of nodes, the predetermined two-dimensional coordinate system, the volume, the workpiece, the detecting, the set of detectors, the first detector, the respective locations and/or bearings, the set of robots, the first robot, the respective bases, end effectors and working envelopes, the respective three-dimensional coordinate systems, the controlling, the controller and/or the movement of the set of robots may be as described with respect to the first aspect.

The method may include any of the steps described with respect to the first aspect.

Computer, Computer Program, Non-Transient Computer-Readable Storage Medium

The third aspect provides a computer comprising a processor and a memory configured to implement, at least in part, a method according to the second aspect.

The fourth aspect provides a computer program comprising instructions which, when executed by a computer comprising a processor and a memory, cause the computer to perform, at least in part, a method according to the second aspect.

The fifth aspect provides a non-transient computer-readable storage medium comprising instructions which, when executed by a computer comprising a processor and a memory, cause the computer to perform, at least in part, a method according to the second aspect.

Definitions

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention, such as colourants, and the like.

The term "consisting of" or "consists of" means including the components specified but excluding other components.

Whenever appropriate, depending upon the context, the use of the term "comprises" or "comprising" may also be taken to include the meaning "consists essentially of" or "consisting essentially of", and also may also be taken to include the meaning "consists of" or "consisting of".

The optional features set out herein may be used either individually or in combination with each other where appropriate and particularly in the combinations as set out in the accompanying claims. The optional features for each aspect or exemplary embodiment of the invention, as set out herein are also applicable to all other aspects or exemplary embodiments of the invention, where appropriate. In other words, the skilled person reading this specification should consider the optional features for each aspect or exemplary embodiment of the invention as interchangeable and combinable between different aspects and exemplary embodiments.

BRIEF DESCRIPTION OF THE DRAWINGS

For a better understanding of the invention, and to show how exemplary embodiments of the same may be brought into effect, reference will be made, by way of example only, to the accompanying diagrammatic Figures, in which.

DETAILED DESCRIPTION OF THE DRAWINGS

Figure 1:
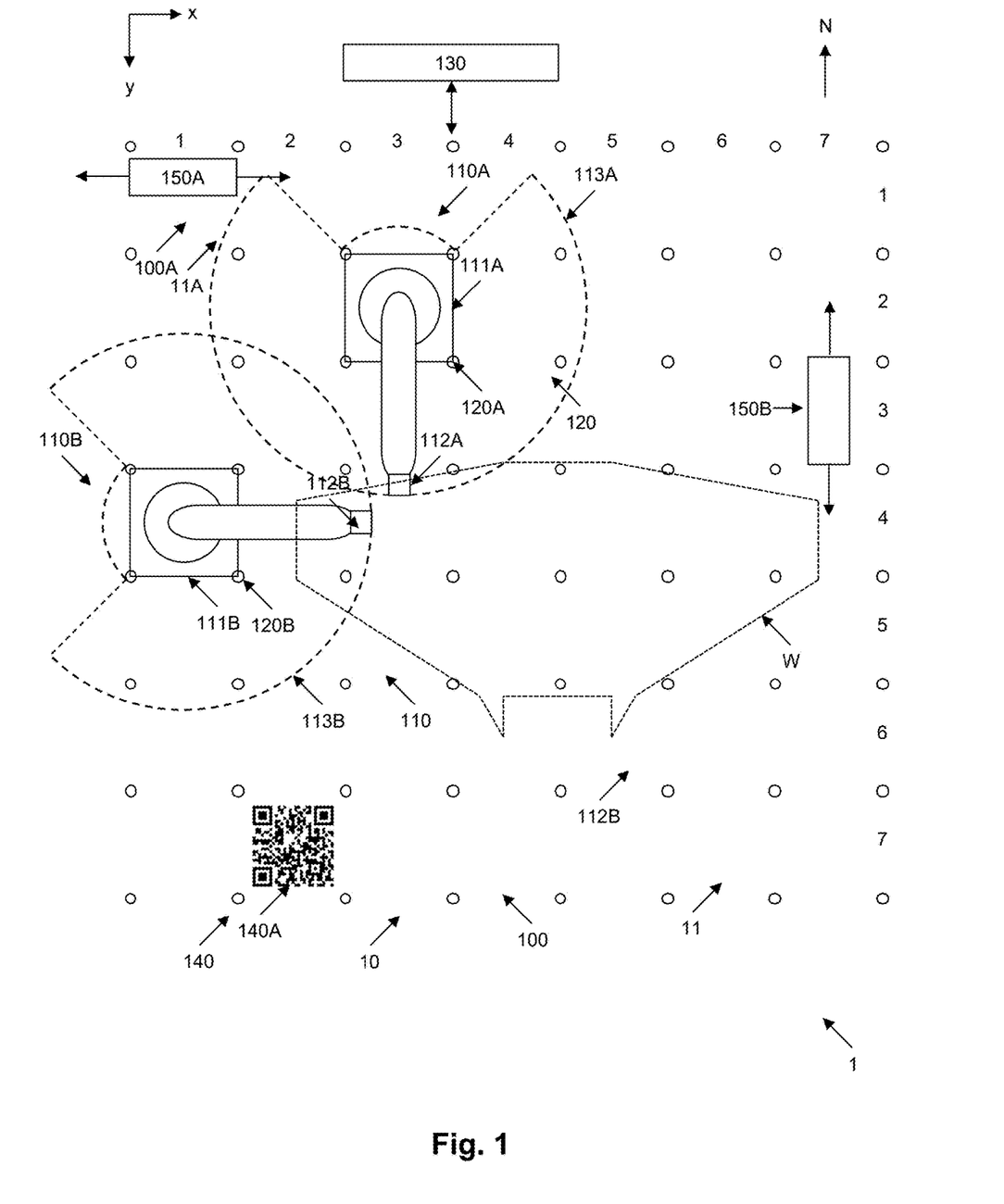
FIG. 1 schematically depicts a robot cell according to an exemplary embodiment.

FIG. 1 schematically depicts a robot cell 1 according to an exemplary embodiment.

The first aspect provides a robot cell 1, having a cell floor 10 defining an array of nodes 100 corresponding with a predetermined two-dimensional coordinate system and defining a volume for receiving a workpiece W (shown in dotted lines) therein, wherein the robot cell 1 comprises:
- a set of robots 110, including a first robot 110A, having respective bases 111 (111A), end effectors 112 (112A) and working envelopes 113 (113A) and defining respective three-dimensional coordinate systems, located according to the array of nodes 100;
- a set of detectors 120, including a first detector 120A, configured to detect respective locations and/or bearings of the set of robots 110; and
- a controller 130, communicatively coupled to the set of robots 110 and to the set of detectors 120, configured to control movement of the set of robots 110 using the detected respective locations and/or bearings of the set of robots 110.

In this example, a first node 100A of the set thereof comprises an attachment point for a robot. In this example, the first node 100A of the array thereof is a square cell floor module 11A, comprising an attachment point for a robot, wherein the cell floor 10 is provided by a corresponding array of cell floor modules 11.

In this example, respective nodes 100 of the array thereof are regularly arranged on the predetermined two-dimensional coordinate system, in a square array. In this example, respective nodes 100 of the array thereof tesselate on the predetermined two-dimensional coordinate system. In this example, respective nodes 100 of the array thereof are mutually equispaced on the predetermined two-dimensional coordinate system. In this example, the array of nodes 100 includes 49 nodes 100, forming a 7×7 regular square array. For convenience, the array of nodes is labelled using (x, y) notation, providing identification of the respective nodes and hence respective locations of the set of robots 110. For convenience, respective bearings of the set of robots 110 are identified using compass bearings. Other schemes for identifying locations and bearings are known.

In this example, the cell floor 10 comprises a set of electrical and/or communications outlets, including a first electrical and communications outlet (not shown), for releasable coupling to the set of robots 110, wherein the set of electrical and/or communications outlets corresponds with the array of nodes 100. In this example, in use, the set of robots 110 is releasably coupled to a set of electrical and/or communications outlets in the form of a ring circuit embedded in the cell floor.

The robot cell 1 defines the volume for receiving the workpiece W therein. In this example, the workpiece W comprises or is an aircraft part, such as an aerostructure.

In this example, the first robot 110A is an articulated or multiaxis robot.

In this example, a ratio of the number of robots included in the set thereof to the number of nodes 100 in the array thereof is 2:49.

In this example, respective bases 111 of the set of robots 110 are releasably attached to the cell floor 10. In this example, respective bases 111 of the set of robots 110 comprise a part, for example a male part, of a releasable attachment (not shown) and the cell floor 10, for example respective nodes 100 and/or cell floor 10 modules, comprises corresponding parts, for example corresponding female parts, of the releasable attachment. In this example, the releasable attachment is a mechanical releasable attachment, provided by mechanical fasteners such as bolts and threaded passageways. In this example, a releasable attachment mechanism is provided at each corner of the node in the cell floor (illustrated in FIG. 1 by a circle at each corner of the node).

In this example, the set of robots 110 includes 2 robots 110A, 110B. In this example, the set of robots 110 includes the second robot 110B, wherein the respective working envelopes 113A, 113B of the first robot 110A and the second robot 110B intersect and wherein the controller 130 is configured to control movement of the first robot 110A and the second robot 110B in mutual coordination using the detected respective locations and/or bearings of the set of robots 110.

In this example, the accuracy and/or the precision of location of the particular robot according to the array of nodes 100 is within 2 mm.

The robot cell 1 comprises the set of detectors 120 configured to detect respective locations and/or bearings of the set of robots 110.

In this example, the location and bearing of the first robot 110A are (3,2) and South, respectively. In this example, the location and bearing of the second robot 110B are (1,4) and East, respectively.

In this example, the first detector 120A is a non-contact detector. In this example, the first detector 120A is a camera. In this example, respective detectors 120 of the set thereof are provided on and/or integrated with the respective robots of the set thereof, in their respective bases 111. In this example, the set of detectors 120 is configured to detect the respective locations and/or bearings of the set of robots 110 using a set of targets 140, including a first target 140A. In this example, the first target 140A is a QR code. In this example, the set of targets is disposed on the cell floor 10. In this example, a plurality of detectors 120A, 120B of the set thereof, for example 2, is provided integrated with the respective robots 110 of the set thereof, in their respective bases 111, wherein each of the detectors of the plurality thereof is a noncontact detector configured to detect respective locations and/or bearings of the set of robots 110 using a set of targets, for example corresponding targets, disposed on and/or in the cell floor 10. In this example, the set of detectors 120, including the first detector 120A, is configured to detect respective locations and/or bearings of the set of robots 110 periodically.

In this example, the first detector 120A along with a further detector (not shown) on the base 111A of robot 110A are configured to detect the respective location and bearing of the first robot 110A using a first target 140A disposed on the cell floor in the node located at 3, 2 and a second target disposed on the cell floor in the node located at 3, 2. Further, the detector 120B along with a further detector (not shown) on the base 111B of the robot 110B are configured to detect the respective location and bearing of the robot 110B using a third target disposed on the cell floor in the node located at 1, 4 and a fourth target (not shown) disposed on the cell floor in the node located at 1, 4. FIG. 1 is not representative of the exact position and size of the target 140A and is placed, and shown in a blown up form, at location 2, 7 for illustrative purposes only. In this example, target 140A is located in the middle of the releasable attachment point provided at a corner of the square node in the cell floor, directly below the detector 120A. Further, in this example, each other target is located in the middle of a releasable attachment point provided at a corner of the square node in the cell floor, directly below its respective detector.

In this example, the controller 130 is configured to initiate an action, in response to the detected respective locations and/or bearings of the set of robots 110. In this example, the action is selected from: identifying a robot of the set thereof having a correct or an incorrect location and/or bearing; identifying a correct location and/or bearing for a particular robot; implementing a remedial action or a safety action such as pausing movement of a particular robot or the set of robots; modifying such as limiting, expanding or restoring a working envelope of a robot of the set thereof; updating a model of the robot cell; programming or reprogramming a robot of the set thereof; request relocation of a particular robot of the set thereof.

In this example, controller 130 is configured to limit a working envelope 113 of a robot of the set thereof, for example based on the detected respective locations and/or bearings of the set of robots 110 and their respective working envelopes 113.

As described above, a reconfigurable cell floor 10 infrastructure has been designed. This cell floor 10 could present a problem with the control of multiple robots 110 and automated assets as they can be located in many different positions (i.e. locations) on the cell floor or multiple orientations (i.e. bearings) in the same place. When driving automation devices around complex high value aerostructures it was decided that there must be a means of both knowing where all assets in the cell 1 are and relating this back to a master control system (i.e. the controller 130) and also to optionally enable all assets to be driven along a common datum scheme (a master three-dimensional coordinate system, which can also be considered as a digital origin frame) instead of their own individual axis. The benefit of doing this is that no matter what orientation or position an asset is in, it can be driven in relation to the aircraft datum which is being assembled, making it significantly safer for built high value product.

Generally, the principle of manufacture is that the robots 110 are used to provide the assembly of major structural aircraft components. The robots 110 bring the components into an accurate position and then hold them while manual operations are undertaken by personnel e.g. bolting together. The accuracy for the system is provided through the use of camera or laser tracking system (i.e. set of sensors 150) which guide the robots/components to the correct location.

The robots 110 are positioned on a floor system 10 which has a regular pattern of attachment nodes 100, which the robots 110 can be located upon (in four orientations). The robots 110 themselves may be standard robots, stripped of their control system and an enhanced control system put on (i.e. the controller 130), which will enable a greater level of control of each robot 110 and path planning as well as parameter setting to optimise the robot settings for aircraft assembly. These robots 110 also have the ability for additional accuracy to be included on the robot through additional sensing (i.e. set of sensors 150), which will provide a feedback to the control system (i.e. controller 130). The robots 110 can be moved around a number of nodes, with cabling managed through underfloor systems. These nodes do not require accuracy requirements other than general flatness, as the external camera systems (i.e. set of sensors 150) provide all accuracy by dynamically correcting robots that are mounted on the nodes. Multiple robots will able to be placed on this floor system and interact with each other in order to assembly complex products.

The robots are able to change their end of arm tooling (i.e. end effectors 112) to pick up different component tools and also process tools such as drilling heads, providing process multifunctionality.

The assembly cell 1 has an overarching control system (i.e. the controller 130) which receives a recipe file or actions (i.e. tasks) which need to be undertaken and then calculate and orchestrate the robots in the cell to undertake the tasks in the recipe. In addition, the control system may:

1. Run a master control co-ordinate system, knowing where all robots in the cell are; and/or
2. Coordinate and reconfigure the safety systems; and/or
3. Visualise the safe zones on the floor; and/or
4. Coordinate the assets coming into and leaving the cell e.g. Automated Mobile robots; and/or
5. Gather data for analysis of key manufacturing characteristics and communicate this to a factory analytics system; and/or
6. Co-ordinate and switch the camera system to whichever robot is moving and requires the additional accuracy feedback.

In this example, the cell 1 comprises a set of sensors 150, including a first sensor 150A, configured to sense respective poses of the set of robots 110. In this example, the first sensor 150A comprises a moveable sensor. In this example, the first sensor 150A comprises a vision system. In this example, the set of sensors 150 includes a second sensor 150B and the first sensor 150A and the second sensor 150B are disposed mutually orthogonally.

In addition with a reconfigurable safety system, the method may also be safety rated to enable the feedback to be used for safety control systems.

Each node in the floor has been installed with a visual marker and the interfacing device (e.g. robot, tool, workstation or HMI) have been installed with a series of camera systems (i.e. the set of detectors 120) monitoring for QR codes (i.e. the set of targets 140). These cameras then feedback the unique QR information to the control system which then calculates both the location and bearing of the device. The camera system then interprets this data to calculate the devices' locations and bearings within the cell 1 and publishes this to the cell control system (i.e. the controller 130) and optionally, a safety system. The safety system uses the data to configure, adapt or confirm the safety limits within the cell. The control system (i.e. the controller 130) can use the data in a number of different ways, including but not limited to:

1. A queriable parameter of a device e.g. for a console command where is device x located; and/or
2. An event trigger linked to a sequence in the recipe or to react to a change e.g. tool moved to incorrect position therefore trigger floor lights to show correct position; and/or
3. A status modifier e.g. confirm devices x is in position y before undertaking task z; and/or
4. A variable/identifier within a programme e.g. autonomously deliver part to location x, an adaptation to the path programme can be made based on variable x; and/or
5. A transformation parameter e.g. in the case of a robot the position and orientation related to aircraft datum to transform robot base coordinate frame into aircraft datum, therefore all devices within the system are working to a common coordinate frames.

These processes can then be applied to any automation device or item requiring positioning in the future.

In this example, a safety rated camera and QR codes are being used, but the system will work as well with any safety rated sensing system which may be on the market e.g. RFID tags, AprilTags, coded proximity sensors.

This describes the method of enabling a master datum system for a reconfigurable system:

1. A Reconfigurable node assembly system with a master control system, which enables all automation devices to be linked to a master co-ordinate system;
2. A system which enables reconfigurable automation assets to have their location known;
3. A system which enables reconfigurable automation assets to have their bearing known;
4. A control system which translates the locations and bearings of assets to enable all automation devices to be driven in relationship to a master (aircraft) datum;
5. A safety rated QR code and camera system for location and bearing measurement; and
6. Optionally, a safety rated feed into the safety PLC for reconfigurable safety.

Figure 2:
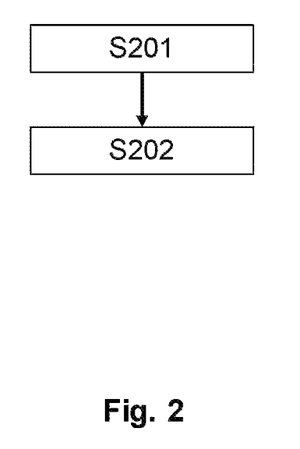
FIG. 2 schematically depicts a method of controlling a robot cell according to an exemplary embodiment.

FIG. 2 schematically depicts a method of controlling a robot cell according to an exemplary embodiment.

The robot cell has a cell floor defining an array of nodes corresponding with a predetermined two-dimensional coordinate system and defining a volume for receiving a workpiece therein.

At S201, the method comprises detecting, by a set of detectors including a first detector, respective locations and/or bearings of a set of robots, including a first robot, having respective bases, end effectors and working envelopes and defining respective three-dimensional coordinate systems, located according to the array of nodes.

At S202, the method comprises controlling, by a controller communicatively coupled to the set of robots and to the set of detectors, movement of the set of robots using the detected respective locations and/or bearings.

Although a preferred embodiment has been shown and described, it will be appreciated by those skilled in the art that various changes and modifications might be made without departing from the scope of the invention, as defined in the appended claims and as described above.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the steps of any method or process so disclosed, may be combined in any combination, except combinations where at most some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims and drawings), or to any novel one, or any novel combination, of the steps of any method or process so disclosed.

What is claimed is:

1. A robot cell, comprising:
a cell floor defining an array of nodes corresponding with a predetermined two-dimensional coordinate system and defining a volume for receiving a workpiece therein;
a set of robots, including a first robot, each of the robots of the set of robots having a respective base, end effector and working envelope and defining a respective three-dimensional coordinate system, located according to the array of nodes;
a set of detectors, including a first detector, each of the detectors of the set of detectors being configured to detect a location and/or bearing of a respective robot of the set of robots using a set of targets disposed on and/or in the cell floor; and
a controller, communicatively coupled to the set of robots and to the set of detectors, the controller being configured to control movement of the set of robots using the detected respective locations and/or bearings of the set of robots.

2. The robot cell according to claim 1, wherein the respective bases of the set of robots are releasably attached to the cell floor.

3. The robot cell according to claim 1, wherein the cell floor comprises a set of electrical and/or communications outlets, including a first electrical and/or communications outlet, and wherein the set of robots is releasably coupled thereto.

4. The robot cell according to claim 1, wherein respective nodes of the array thereof are mutually equispaced on the predetermined two-dimensional coordinate system.

5. The robot cell according to claim 1, wherein the first detector is provided on and/or integrated with the first robot.

6. The robot cell according to claim 1, wherein the first detector is a non-contact detector configured to detect the location and/or bearing of the first robot using the set of targets disposed on and/or in a corresponding node in the cell floor.

7. The robot cell according to claim 1, wherein the first detector is a camera, a RFID tag reader, a barcode reader, a fiducial marker reader and/or a proximity sensor.

8. The robot cell according to claim 1, wherein the robot cell comprises a set of sensors, including a first sensor, the sensors of the set of sensors being configured to sense respective poses of the set of robots.

9. The robot cell according to claim 1, wherein the controller is configured to obtain a master three-dimensional coordinate system and to control the movement of the set of robots according to the obtained master three-dimensional coordinate system.

10. The robot cell according to claim 9, wherein the obtained master three-dimensional coordinate system is defined, at least in part, by a workpiece received in the defined volume.

11. The robot cell according to claim 9, wherein the controller is configured to correlate respective three-dimensional coordinate systems of the set of robots, the predetermined two-dimensional coordinate system and a three-dimensional coordinate system of the workpiece to the obtained master three-dimensional coordinate system.

12. The robot cell according to claim 1, further comprising a safety system, wherein the controller is communicatively coupled to the safety system and configured to arrange the safety system using the detected respective locations and/or bearings.

13. The robot cell according to claim 12, wherein the safety system is configured to indicate a path for a human operator on the cell floor using a set of visual alerts.

14. The robot cell according to claim 1, wherein the set of robots includes a second robot, wherein the respective working envelopes of the first robot and the second robot intersect and wherein the controller is configured to control movement of the first robot and the second robot in mutual coordination using the detected respective locations and/or bearings of the set of robots.

15. A method of controlling a robot cell, having a cell floor defining an array of nodes corresponding with a predetermined two-dimensional coordinate system and defining a volume for receiving a workpiece therein, wherein the method comprises:
detecting, by a set of detectors, including a first detector, and a set of targets disposed on and/or in the cell floor, respective locations and/or bearings of a set of robots, including a first robot, having respective bases, end effectors and working envelopes and defining respective three-dimensional coordinate systems, located according to the array of nodes; and
controlling, by a controller communicatively coupled to the set of robots and to the set of detectors, movement of the set of robots using the detected respective locations and/or bearings.

* * * * *